H. LAMMERTZ.
PORTABLE PLANT FOR THE TREATMENT OF GARBAGE, REFUSE, OFFAL, DEAD ANIMALS, AND THE LIKE.
APPLICATION FILED NOV. 10, 1919.
Reissued Mar. 8, 1921.
15,059.
2 SHEETS—SHEET 1.
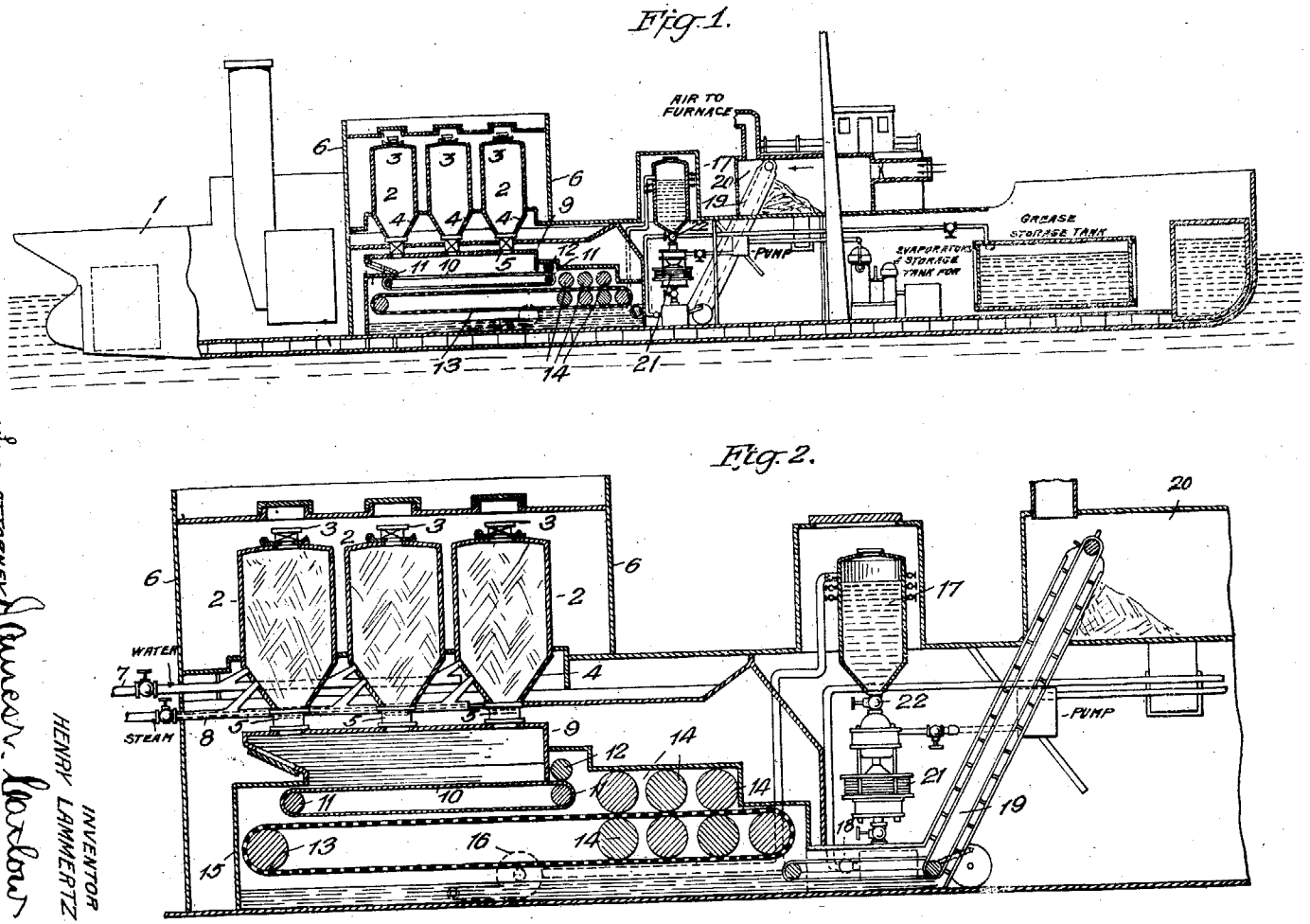
INVENTOR
HENRY LAMMERTZ
BY his ATTORNEY James r. Barlow
NORRIS PETERS, INC., LITHO., WASHINGTON, D. C.

H. LAMMERTZ.

PORTABLE PLANT FOR THE TREATMENT OF GARBAGE, REFUSE, OFFAL, DEAD ANIMALS, AND THE LIKE.

APPLICATION FILED NOV. 10, 1919.

Reissued Mar. 8, 1921. 15,059.

2 SHEETS—SHEET 2.

INVENTOR
HENRY LAMMERTZ
BY his ATTORNEY James E. Carter

UNITED STATES PATENT OFFICE.

HENRY LAMMERTZ, OF PHILADELPHIA, PENNSYLVANIA.

PORTABLE PLANT FOR THE TREATMENT OF GARBAGE, REFUSE, OFFAL, DEAD ANIMALS, AND THE LIKE.

15,059. Specification of Reissued Letters Patent. Reissued Mar. 8, 1921.

Original No. 1,259,248, dated March 12, 1918, Serial No. 160,586, filed April 7, 1917. Application for reissue filed November 10, 1919. Serial No. 337,018.

*To all whom it may concern:*

Be it known that I, HENRY LAMMERTZ, a citizen of the United States, and a resident of the city of Philadelphia, county of Philadelphia, and State of Pennsylvania, have invented a certain new and useful Improvement in Portable Plants for the Treatment of Garbage, Refuse, Offal, Dead Animals, and the like, of which the following is a specification, reference being had to the accompanying drawings, which form a part of the same.

The principal object of my invention is to provide a plant for treating garbage, refuse, offal, dead animals, and the like, on a float or other water buoyed vessel adapted to travel under its own power or otherwise.

The purpose of this object is to furnish such a float or vessel having a disposal plant thereon for the collection of discarded matter at a convenient place on a river or other body of water, which may be within the confines of a community and carry such matter on such float or vessel to a point for treatment, which is far enough away from a settled community to insure freedom therein from obnoxious odor necessarily emitted upon the treatment of such matter.

Another advantage of my invention lies in the fact that the embodiment thereof is adapted for temporary location and thus avoids the risk of becoming a public nuisance, as is often the case with stationary plants built for such purposes, due to a community being then or afterward built up in its locality.

I make no claim for the use of a portable plant for the purposes named for use on land vehicles such as cars, automobiles or carts as such a plant would not always have the advantage of the ready supply of water in unlimited quantities which is necessary for the reduction of the discarded matter.

In the drawings—

Figure 1 is a sectional view of a boat showing the main portions of a disposal plant thereon;

Fig. 2 is an enlarged sectional detail view of the plant;

Figure 3:
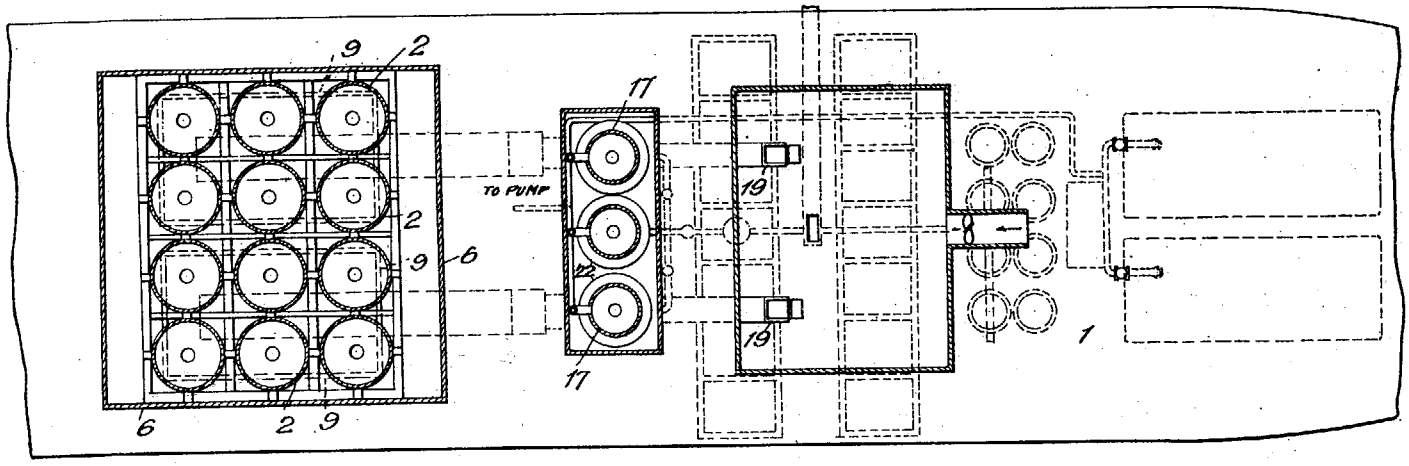
Fig. 3 is a horizontal sectional view of a portion of the plant.
Figure 4:
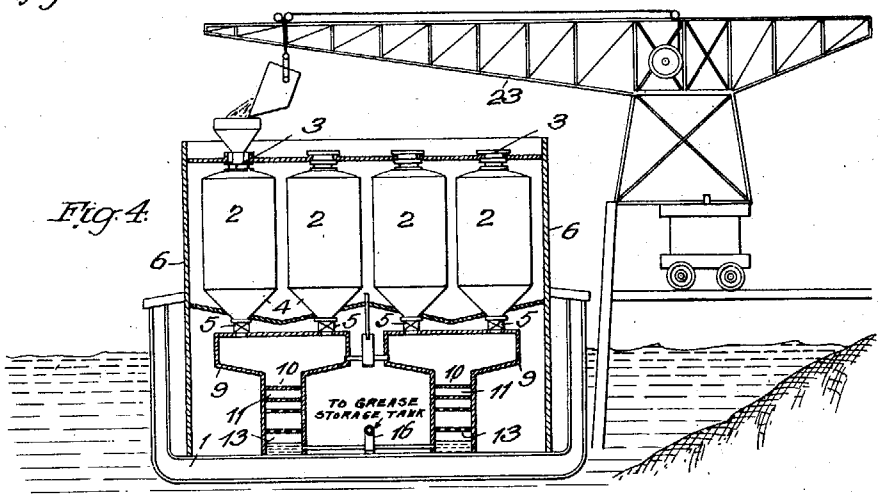
Fig. 4 is a transverse sectional view showing the means for filling the digesters.

Referring now in detail to the drawings, in which similar numerals refer to similar parts throughout, 1 is a suitable float or water buoyed vessel, which may be propelled by self contained power or may be towed, depending upon the adaptability of the boat for self propulsion or for towing, and also depending, of course, upon the exigencies of the situation. That is, even though the vessel may be provided with means for self propulsion, it may, of course be towed without relying upon its own means for movement.

In the drawings, I have shown as being built in the boat 1 a disposal plant consisting of digesters, means for emptying the same of their contents when they have been processed therein, means for extracting the liquid and grease from such processed material, and means for reclaiming the valuable products. It is understood, of course, that any means for processing garbage, refuse, offal, dead animals and the like may be used in conjunction with a portable water buoyed vessel, without departing from the spirit of my invention. The apparatus shown, however will now be described.

In the embodiment shown, I have provided a series of digesters 2 provided with manholes 3, having suitable covers thereon as shown. The bottoms of these digesters are preferably made of tapered form so as to permit the ready emptying thereof when required in cases where it is preferable to empty such digesters from their bottoms as in the embodiment shown. The contents of each of these digesters is controlled by a valve 5 as shown. These digesters are arranged in batteries as shown in Fig. 3 and are contained in a tank room 6. Leading to the bottom of each digester is a connection to a water pipe 7 and a steam pipe 8 as is shown in Fig. 2.

Below the digesters, I have provided receiving tanks 9. The bottoms of the receiving tanks are preferably inclined so as to guide the contents onto the traveling belt or apron 10 which runs over rollers 11.

Underneath this apron 10 is shown a perforated apron 13 which passes between pressure rollers 14. The matter drained through this perforated apron falls into the compartment 15, which is emptied by a pump or other suitable means into grease separating tank 17. At the end of the apron 13 is an endless belt 18 which forms the heel of a conveyer 19 adapted to carry the solid matter into a storage tank 20. A hydraulic press 21 is located below the tank 17 for the purpose of straining the liquid preparatory to its being removed for a further treatment when necessary.

Matter to be treated by my apparatus may be loaded onto the deck of a vessel embodying my invention either directly from the collecting vehicles or it may be fed into the digesters instead of first being loaded onto the deck. For this latter purpose, a crane 23 is shown, which may be located on a dock along which a boat is moored or may be located on the vessel itself. By means of this crane, the garbage may be passed into the digesters 2 through a funnel placed there for that purpose. When the digesters are filled they are sealed and steam is fed into the same to cook the matter therein. After the cooking process is completed, the digesters 2 are emptied by opening the valves 5 and the contents of the digesters are passed into the receivers 9. The matter is then carried by the traveling apron 10 between the rolls 11 and 12 and then the same is discharged upon the perforated apron 13, the grease and moisture passing through the perforations into the bottom of the compartment 15. The liquid matter is then drawn up by means of the pump 16 into the grease separating tank 17. Solid portions of the matter processed are passed between the rolls 14 and thence to the conveyer 18 which carries the pressed matter to the storage room 20. A large proportion of grease is recovered in the settling tanks 17, but there still remains in the water valuable solid matter. The liquid containing this solid matter is passed into the hydraulic press 21 by opening the valve 22 and is pressed through cheese cloth or other suitable straining element and the remaining liquid is pumped away for evaporation. In this manner all of the available solids are recovered.

Where it is advisable further to treat liquid passing from the hydraulic press, this may be done by passing the same to auxiliary grease separating tanks 23, where any remaining grease will be recovered.

Claims.

1. A disposal plant consisting of a plurality of cookers, receivers for receiving the products of said cookers, an endless belt in communication with said receivers and adapted to carry matter emptied into said receivers, an endless perforated apron adapted to receive matter from said endless belt, a series of rolls for pressing the matter carried by said perforated apron, a conveyer arranged to receive matter delivered from said perforated apron, a compartment for receiving the liquid forced out by the pressure rolls, a pump for elevating the liquid and a grease separating tank.

2. A disposal plant consisting of a plurality of cookers, receivers for receiving the products of said cookers, an endless belt in communication with said receivers, and adapted to carry matter emptied into said receiver, an endless perforated apron adapted to receive matter from said endless belt, a series of rolls for pressing the matter carried by said perforated apron, a conveyer arranged to receive matter delivered from said perforated apron, a compartment for receiving the liquid forced out by the pressure rolls, a pump for elevating the liquid, a grease separating tank and means for separating the grease and water collected in said separating tank.

3. A disposal plant consisting of a battery of digesters adapted to receive garbage, refuse, offal, dead animals and the like, means for supplying water and steam to the contents of said digesters and means for discharging from said digesters the contents thereof, a common receiving tank for a plurality of said digesters, a traveling endless belt in communication with said receiving tank and adapted to carry matter therefrom, pressure rollers for pressing the matter carried by said endless belt, a perforated endless traveling apron adapted to receive the contents of said endless belt, a plurality of pressure rolls for pressing matter carried by said endless perforated apron, said perforated apron being adapted to permit liquids and semi-liquids to pass therethrough, and a conveyer adapted to receive solid matter from said perforated apron.

HENRY LAMMERTZ.